(12) United States Patent
Harman et al.

(10) Patent No.: US 6,775,600 B1
(45) Date of Patent: Aug. 10, 2004

(54) SYSTEMS AND METHODS FOR DETERMINING A SPACECRAFT ORIENTATION

(75) Inventors: Richard R Harman, Elkridge, MD (US); Richard J Luquette, Eldersburg, MD (US); Michael H Lee, Stafford, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/267,092

(22) Filed: Oct. 7, 2002

(51) Int. Cl.⁷ ................................................ G05D 1/00
(52) U.S. Cl. ....................................................... 701/13
(58) Field of Search .............................. 701/1, 13, 226; 345/427, 418, 589, 654, 661, 665, 700

(56) References Cited

U.S. PATENT DOCUMENTS

| | | | |
|---|---|---|---|
| 4,658,361 A | * | 4/1987 | Kosaka et al. ................. 701/13 |
| 5,473,746 A | | 12/1995 | Pritt et al. |
| 5,617,332 A | * | 4/1997 | Fressola ....................... 345/13 |
| 6,102,338 A | * | 8/2000 | Yoshikawa et al. .......... 244/171 |
| 6,512,979 B1 | * | 1/2003 | Needelman et al. ......... 701/222 |

OTHER PUBLICATIONS

Rudd "APL Graphics Representation and Analysis of Space–Based observations", ACM SIGAPL APL Quote Quad, Proceeding of the internatinal conference on APL May 1986, vol. 16, Issue 4.*

* cited by examiner

*Primary Examiner*—Thu V. Nguyen

(57) ABSTRACT

Disclosed are systems and methods of determining or estimating an orientation of a spacecraft. An exemplary system generates telemetry data, including star observations, in a satellite. A ground station processes the telemetry data with data from a star catalog, to generate display data which, in this example, includes observed stars overlaid with catalog stars. An operator views the display and generates an operator input signal using a mouse device, to pair up observed and catalog stars. Circuitry in the ground station then processes two pairs of observed and catalog stars, to determine an orientation of the spacecraft.

31 Claims, 8 Drawing Sheets observation element 261 (data for star 26): time tag 220; vector 221; star magnitude 222; status data 223.

observation element 230 (data for star 27): time tag 220; vector 221; star magnitude 222; status data 223.

observation element 262 (data for star 28): time tag 220; vector 221; star magnitude 222; status data 223.

observation element 263 (data for star 31): time tag 220; vector 221; star magnitude 222; status data 223.

observation element 264 (data for star 41): time tag 220; vector 221; star magnitude 222; status data 223.

observation element 265 (data for star 44): time tag 220; vector 221; star magnitude 222; status data 223.

observation element 266 (data for star 42): time tag 220; vector 221; star magnitude 222; status data 223.

observation element 267 (data for star 46): time tag 220; vector 221; star magnitude 222; status data 223.

observation element 232 (data for star 32): time tag 220; vector 221; star magnitude 222; status data 223.

observation element 268 (data for star 47): time tag 220; vector 221; star magnitude 222; status data 223.

attitude history file 205:
        quaternion element 206: time tag; 4 numbers encoding orientation.
        quaternion element 207: time tag; 4 numbers encoding orientation.
        quaternion element 208: time tag; 4 numbers encoding orientation.

Fig. 5

Time:        20010906.041042145
Q1:          0.10431220
Q2:          -0.72324804
Q3:          -0.19211753
Q4:          0.65507411

Fig. 8

SYSTEMS AND METHODS FOR DETERMINING A SPACECRAFT ORIENTATION

BACKGROUND OF THE INVENTION

Origin of the Invention

The invention described herein was made by an employee of the United States Government, and may be manufactured and used by or for the Government for governmental purposes without the payment of any royalties thereon or therefor.

1. Field of the Invention

This invention relates generally to spacecraft and, more particularly, to systems and methods for determining a spacecraft orientation.

2. Description of Related Art

Satellite applications typically require knowledge of the satellite orientation or attitude. For example, a communication satellite may be required to point a radio antenna at a particular ground station. If the satellite orientation is wrong, the radio signal may miss the ground station.

Many satellites use star sensors to determine their orientation by processing positions of identified stars in the fields of view of the sensors. This process typically requires an initial determination, or estimate, of the satellite orientation.

SUMMARY OF THE INVENTION

It is an object of the present invention to provide systems and methods of determining or estimating an orientation of a spacecraft. According to an aspect of the present invention, there is a method for operating with a spacecraft and a first signal, the first signal including star position data. The method comprises generating a second signal in the spacecraft, the second signal including star observations; processing the first and second signals; generating a third signal responsive to the processing step; displaying the third signal; viewing the displayed third signal; responsive to the viewing step, generating a fourth signal; and processing the fourth signal to determine an orientation of the spacecraft.

According to another aspect of the present invention, there is a system for operating with a first signal including star position data and a spacecraft having a generator that generates a second signal, the second signal including star observations. The system comprises a first processor that processes the first and second signals to generate a third signal for display; and a second processor that receives a fourth signal, identifying features in the third signal, and processes the fourth signal to determine an orientation of the spacecraft.

According to yet another aspect of the present invention, there is a system for operating with a spacecraft and a first signal, the first signal including star position data. The system comprises means for generating a second signal in the spacecraft, the second signal including star observations; means for processing the first and second signals; means for generating a third responsive to the processing means; means for receiving a fourth signal identifying features in the third signal; and means for processing the fourth signal to determine an orientation of the spacecraft.

BRIEF DESCRIPTION OF THE DRAWINGS

References are made to the following description taken in connection with the accompanying drawings, in which:

FIG. 5 is a diagram of a data structure employed in the first preferred system.

FIG. 8 is a diagram showing an output of the first preferred system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF A FIRST PREFERRED EMBODIMENT

Figure 1:
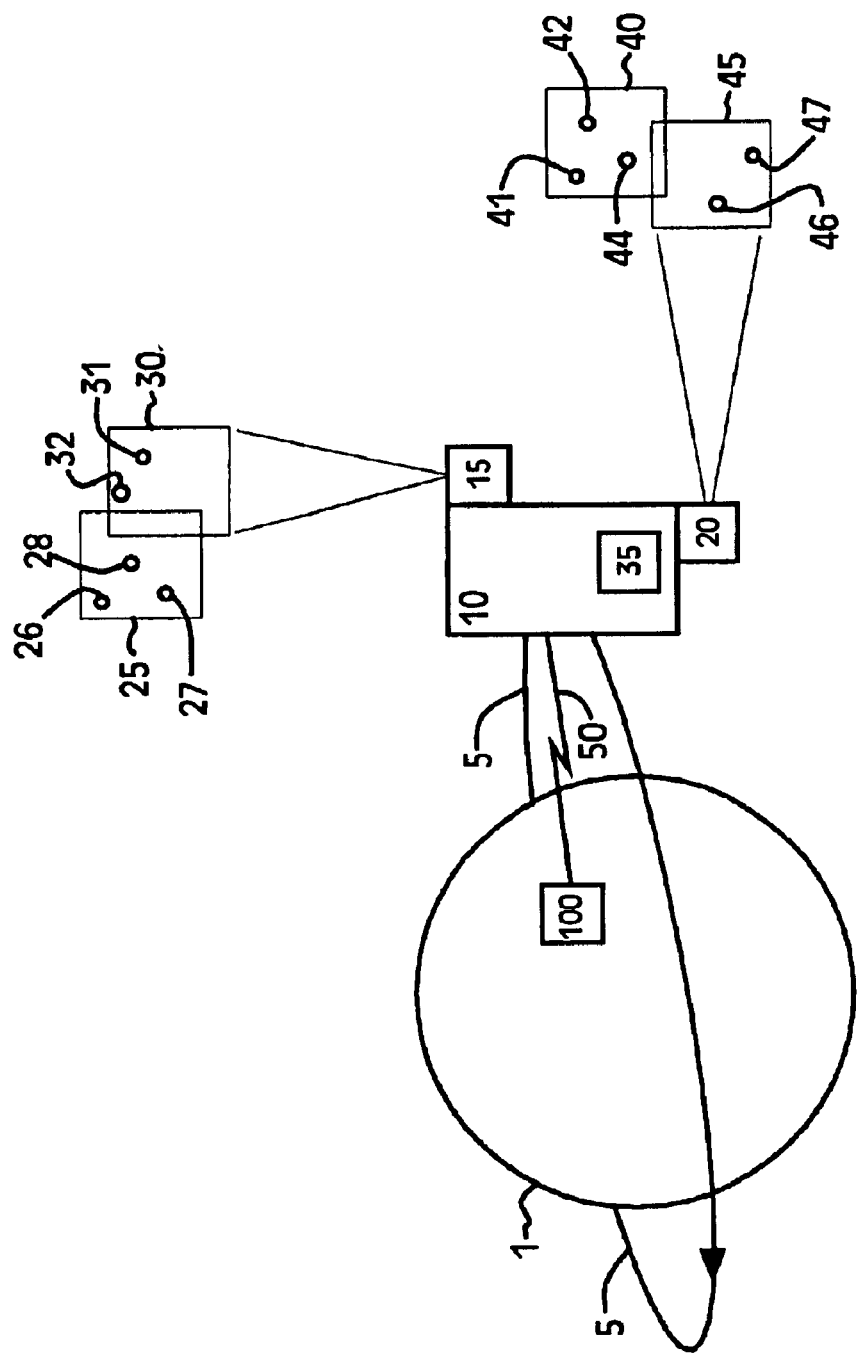
FIG. 1 is a diagram showing a satellite and ground system in accordance with a first embodiment of the present invention.

FIG. 1 shows satellite 10, in orbit 5 around earth, and ground system 100, in accordance with a first embodiment of the invention. Satellite 10 includes star sensor 15 acting to observe light. At the time depicted in FIG. 1, star sensor 15 acts to observe light within view field 30. The light in field 30 includes light from star 31 and light from star 32. Satellite 10 processes signals from sensor 15 to generate data representing star 31 and star 32, and store the data in memory 35 in satellite 10.

Because satellite 10 is moving, the field observed by sensor 15 changes with time. For example, at a time previous to the time depicted in FIG. 1, sensor 15 detected light within view field 25. The light in field 25 includes light from stars 26, 27, and 28.

Satellite 10 also includes star sensor 20. At the time depicted in FIG. 1, star sensor 20 acts to observe light within view field 45. The light in field 45 includes light from star 46 and light from star 47. Satellite 10 processes signals from sensor 20 to generate data representing star 46 and star 47, and store the data in memory 35 in satellite 10. Because satellite 10 is moving, the field observed by sensor 20 changes with time. For example, at a time previous to the time depicted in FIG. 1, sensor 20 detected light within view field 40. The light in field 40 includes light from stars 41, 42, and 44.

Satellite 10 also maintains an attitude history file in memory 35. The attitude history file includes multiple time tagged attitude quaternions. Each quaternion is equivalent to a pitch angle, yaw angle, and roll angle describing the satellite orientation at a particular time.

Satellite 10 may send contents of memory 35 to ground station 100, via radio downlink 50.

Figure 2:
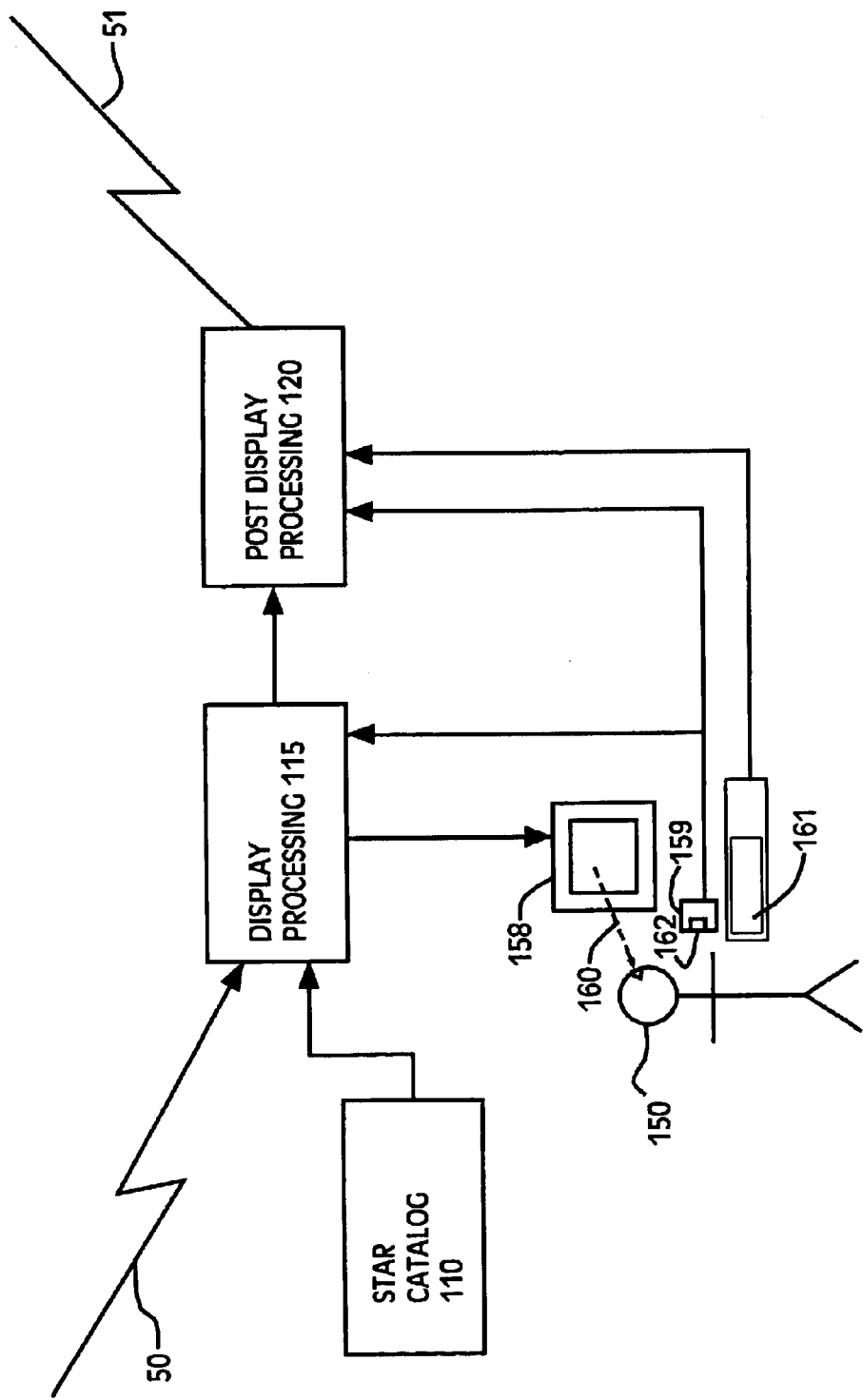
FIG. 2 is a diagram emphasizing certain circuitry in the ground system shown in FIG. 1.

FIG. 2 shows some circuitry in a control station of ground system 100. In this Patent Application, the word circuitry encompasses dedicated hardware, and/or programmable hardware, such as a CPU or reconfigurable logic array, in combination with programming data, such as sequentially fetched CPU instructions or programming data for a reconfigurable array.

Figure 3:
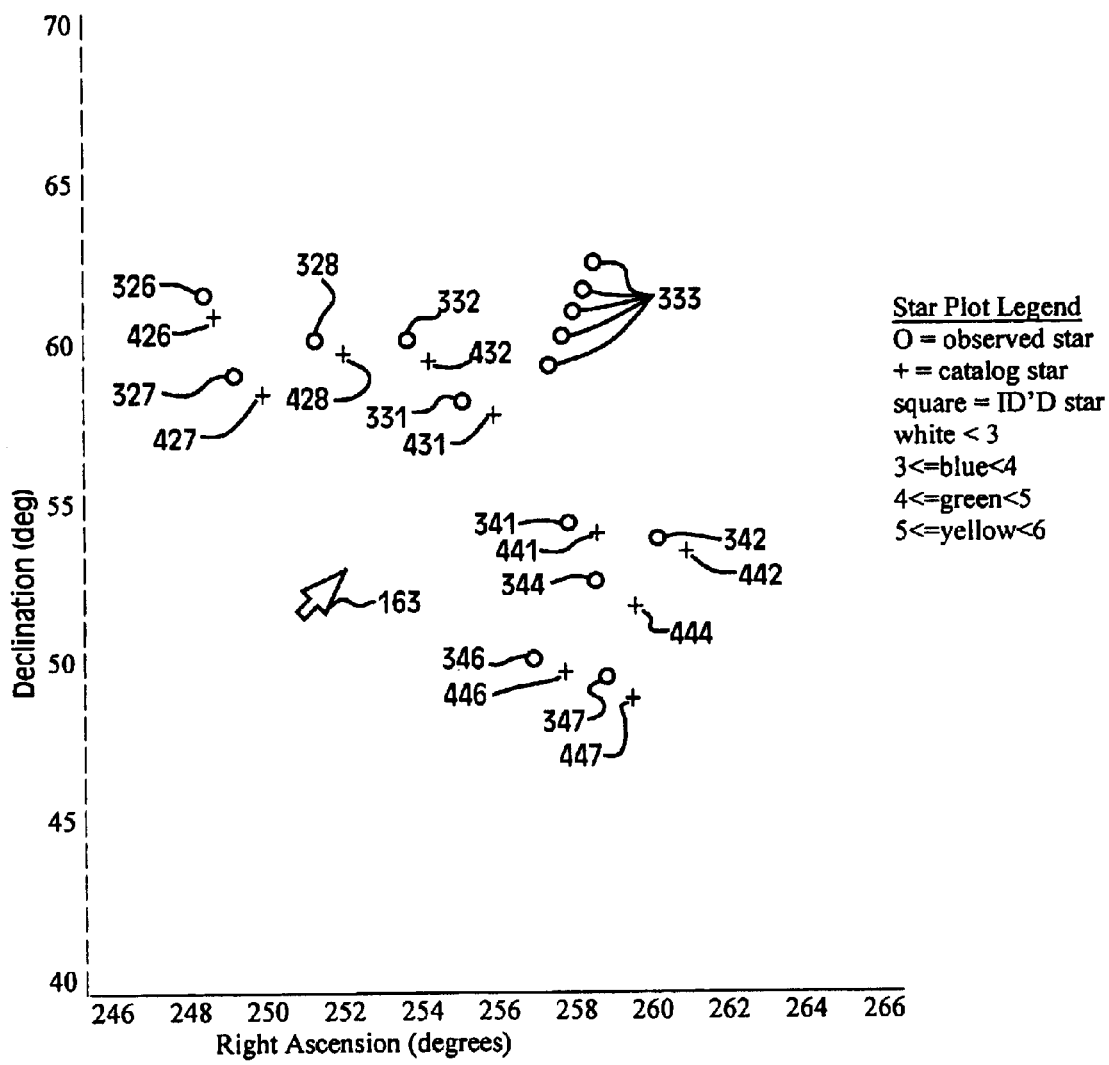
FIG. 3 is a diagram of a user display generated by the ground system shown in FIG. 2.

The ground control station includes a user interface having a cathode ray tube (CRT) display 158, keyboard 16, and mouse input 159. Mouse 159 includes a motion sensor and a left button 162. When operator 150 moves mouse 159, the motion sensor sends a position signal to circuitry 115, causing circuitry 115 to change the position of display cursor 163 (FIG. 3).

When operator 150 presses (actuates) left button 162, mouse 159 sends a selection signal to post display processing circuitry 120. Mouse 159 thus acts as a type of pointing and selecting device.

Star Catalog 110 includes, for each star in the catalog, a star catalog ID number, a vector in a reference coordinate system rotated to a desired epoch time, and a magnitude of catalog star (or color). In this example, the reference coordinate system is the earth at Jan. 1, 2000.

Display processing circuitry 115 processes signals from down link 50, with data from star catalog 110, to generate display data for display 158.

FIG. 3 shows an image on display 158, resulting from display data generated by processing circuitry 115. The display data includes observed stars and catalog stars, with right ascension labeled along the horizontal axis and declination labeled along the vertical axis. In other words, circuitry 115 generates the data including a type of indication of a position of a star represented in the star catalog, and of a star represented in satellite telemetry data.

Observed stars are represented by a circle-shaped symbol, and catalog stars are represented by a cross-shaped symbol ("+"). The symbol color is a function of the star magnitude.

Each symbol position, and color is thus a type of display feature.

As shown in FIG. 3, a formatter in circuitry 115 generates the position and color of circle 326 to correspond to the position and magnitude of observed star 26. Circle 326 is yellow.

The formatter generates the position and color of circle 327 to correspond to the position and magnitude of observed star 27. Circle 327 is green.

The formatter generates the position and color of circle 328 to correspond to the position and magnitude of observed star 28. Circle 328 is yellow.

The formatter generates the position and color of circle 332 to correspond to the position and magnitude of observed star 32. Circle 332 is blue.

The formatter generates the position and color of circle 331 to correspond to the position and magnitude of observed star 31. Circle 331 is blue.

The circles designated 333 are reflections, or some other type of anomaly, and thus do not represent actual star positions. Circles 333 are white.

The formatter generates the positions and colors of circles 341, 342, 344, 346, and 347 to correspond to the positions and magnitudes of observed stars 41, 42, 44, 46, and 47, respectively. Each of circles 341, 342, 344, 346, and 347 is yellow.

A formatter in circuitry 115 generates the position and color of cross 426 to correspond to the position and magnitude of a certain star in star catalog 110. Cross 426 is yellow.

The formatter generates the position and color of cross 427 to correspond to the position and magnitude of another star in star catalog 110. Cross 427 is green.

The formatter generates the position and color of cross 428 to correspond to the position and magnitude of yet another star in star catalog 110. Cross 428 is yellow.

The formatter generates the position and color of cross 432 to correspond to the position and magnitude of yet another star in star catalog 110. Cross 432 is blue.

The formatter generates the position and color of cross 431 to correspond to the position and magnitude of yet another star in star catalog 110. Cross 431 is blue.

The formatter generates the positions and colors of crosses 441, 442, 444, 446, and 447 to correspond to positions and magnitudes other respective stars in the star catalog. Each of crosses 441, 442, 444, 446, and 447 is yellow.

Figure 4:
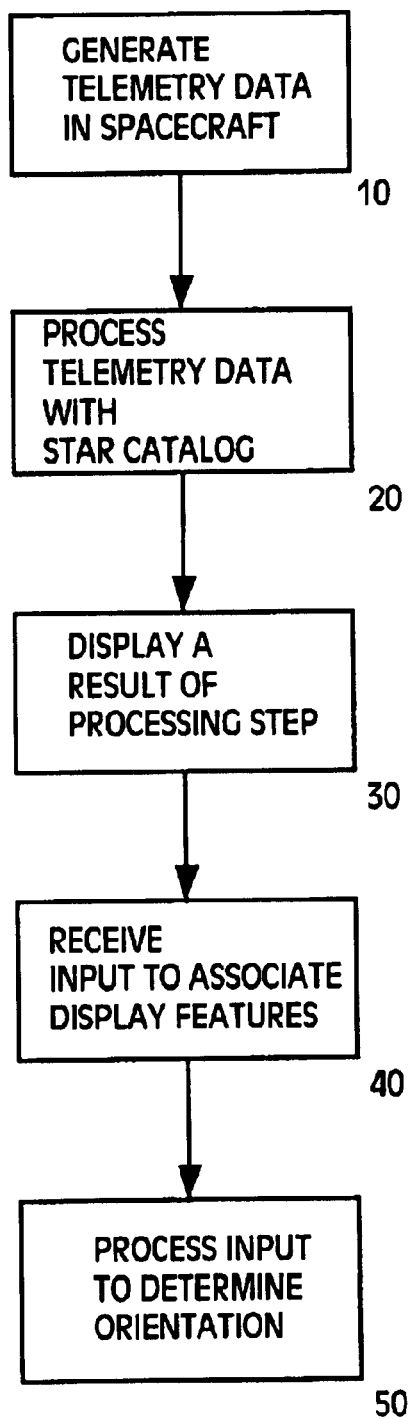
FIG. 4 is a flow chart showing a process performed by the first preferred system.

FIG. 4 is a flow chart showing a processing performed by the first preferred system. Satellite 10 generates telemetry data, including star observations. (step 10). Circuitry 115 in ground station 100 processes the telemetry data with data from a star catalog, to generate display data which, in this example, includes observed stars overlaid with catalog stars. (step 20). Circuitry 115 displays the display data on display 158 for the benefit of operator 150. (step 30).

Operator 150 views display 158 and, in response to the viewed data, manipulates mouse input device 159 or keyboard 161. In other words, operator 150 processes light signal 160 from display 158 and, in response to contents of light signal 160, generates an operator input signal using mouse device 159 of keyboard 161, to pair up observed and catalog stars.

Post display processing circuitry 120 receives the operator input signal from operator 150, via device 159 or keyboard 161, and, depending on the operator input signal, determines an orientation of the satellite 10; circuitry 120 processes two pairs of observed and catalog stars, to determine an orientation of the spacecraft.

Depending on the determined orientation, circuitry 120 may send data to satellite 10 via radio uplink 51.

MORE DETAILED DESCRIPTION OF A PREFERRED EMBODIMENT

FIG. 5 depicts star observation data stored in memory 35. Data for each star may be conceptualized as an observation element including a time tag, indicating the time the star was observed; the observed vector in spacecraft body coordinates; the observed magnitude (or color) with characteristics matching star catalog magnitude; and an observed quality flag (good or bad). An observation element thus includes a type of telemetry data.

Observation element 261 includes telemetry data for star 26, observation element 230 includes telemetry data for star 27, observation element 262 includes telemetry data for star 28, observation element 263 includes telemetry data for star 31, observation element 264 includes telemetry data for star 41, observation element 265 includes telemetry data for star 44, observation element 266 includes telemetry data for star 42, observation element 267 includes telemetry data for star 46, observation element 232 includes telemetry data for star 32, observation element 268 includes telemetry data for star 47.

Sensor 15 in satellite 10 generated the telemetry data for stars 31 and 32 at a common time (T1). Sensor 15 generated the telemetry data for stars 26, 27, and 28 at a common time different than T1.

Sensor 20 in satellite 10 generated the telemetry data for stars 46 and 47 at a common time (T1). Sensor 20 generated the telemetry data for stars 41, 42, and 44 at a common time different than T1.

Circuitry 115 excludes processing of certain observation elements in the downlink signal from satellite 10. For example, circuitry 115 excludes processing of observation elements for which the status data, generated by satellite 10, indicates the observed data may not be valid. Circuitry 115 may also exclude observation elements that circuitry 115 itself determines are invalid.

Circuitry 115 also excludes processing of observation elements having time tags outside user specified processing times.

Circuitry 115 also excludes processing of observation elements for which the star magnitude is below a user specified magnitude; circuitry 115 excludes processing of observation elements for which the star magnitude number is above a user specified maximum number. Thus, circuitry 115 acts to simplify the user display, allowing a human operator to more easily recognize star patterns.

Figure 6:
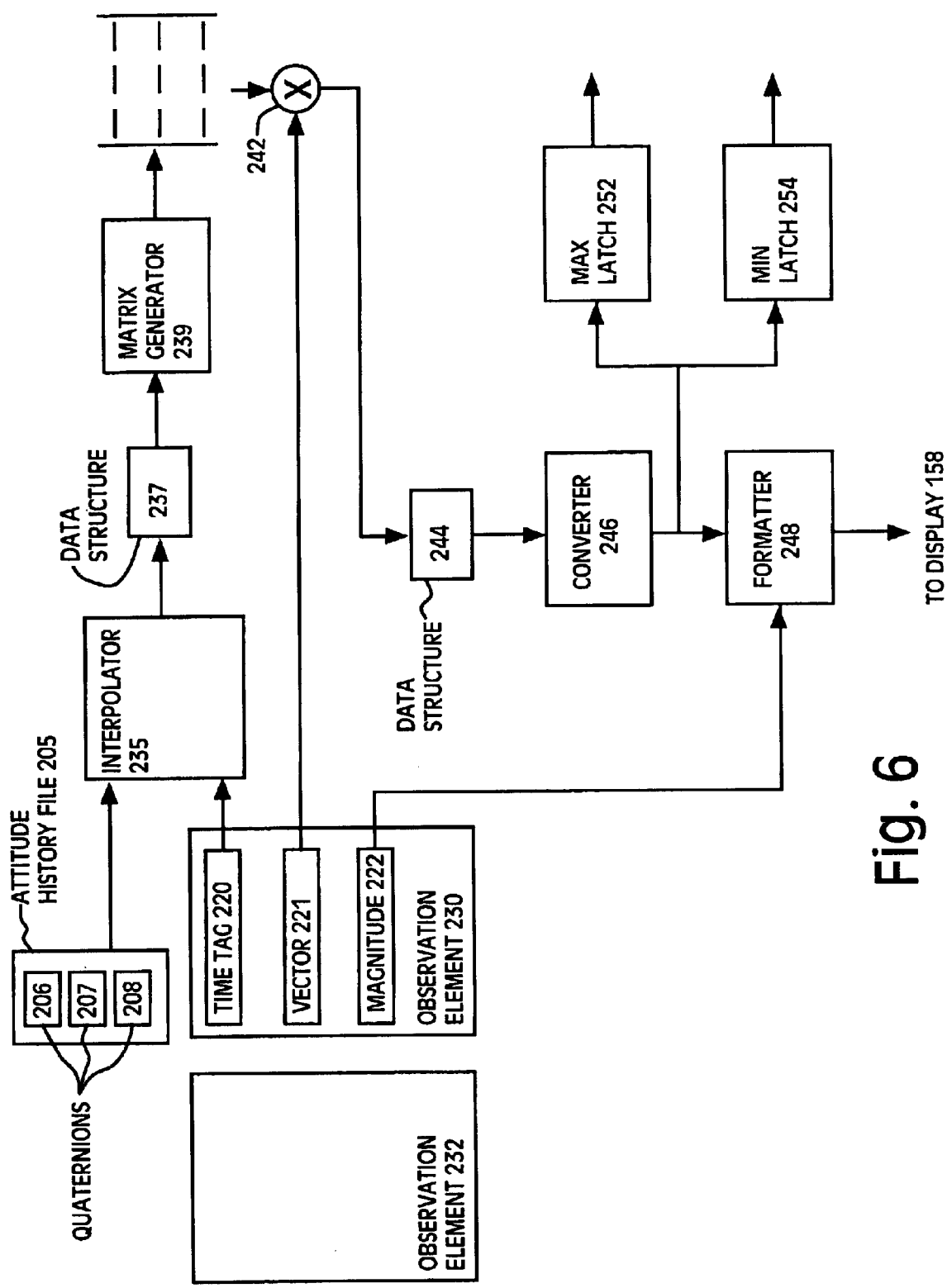
FIG. 6 is a diagram emphasizing a portion of the circuitry shown in FIG. 2.

FIG. 6 is a diagram depicting some circuitry in circuitry 115 that processes the observation elements remaining after the exclusion processing described above. Circuitry 115 associates each remaining observation element with an estimated orientation of satellite 10. More specifically, interpolator 235 associates each observation element with a respective quaternion by deriving rates from successive quaternion pairs and using the observation element time tag 220, to kinematically propagate the closest time tagged quaternion to the corresponding observation time tag. Interpolator 235 generates a respective quaternion for each observation element, by interpolating between quaternions 206, 207, and 208 in attitude history file 205. For example, at the time depicted in FIG. 6, interpolator 235 generates a quaternion associated with observation element 230 and stores the quaternion into data structure 237.

Circuitry 115 places each observation into the reference coordinate system, by converting the quaternion, in each quaternion-star observation pair, into an attitude matrix, generating the transpose of the attitude matrix, and multiplying each star vector by the transpose of the attitude matrix. More specifically, matrix generator 239 takes the quaternion in structure 237 as input, generates the corresponding attitude matrix, generates the transpose of the corresponding attitude matrix, and stores the transpose into structure 240. Multiplier 242 multiplies this transpose by vector 221 of the associated observation element, and stores the result in data structure 244, the result being the location of the observation in the reference coordinate system.

Circuitry 115 converts the observed star vectors to right ascension and declination; converter 246 takes structure 244 as input, converts to right ascension and declination, and sends the result to formatter 248.

Formatter 248 generates a symbol, to represent an observed star, and modulates the displayed color of the symbol depending on the value of the magnitude in field 222 of the observation element. The symbol generated by formatter 248 is sent to display 158.

Latch 252 remembers the maximum right ascension and maximum declination. Latch 254 remembers the minimum right ascension and minimum declination.

Figure 7:
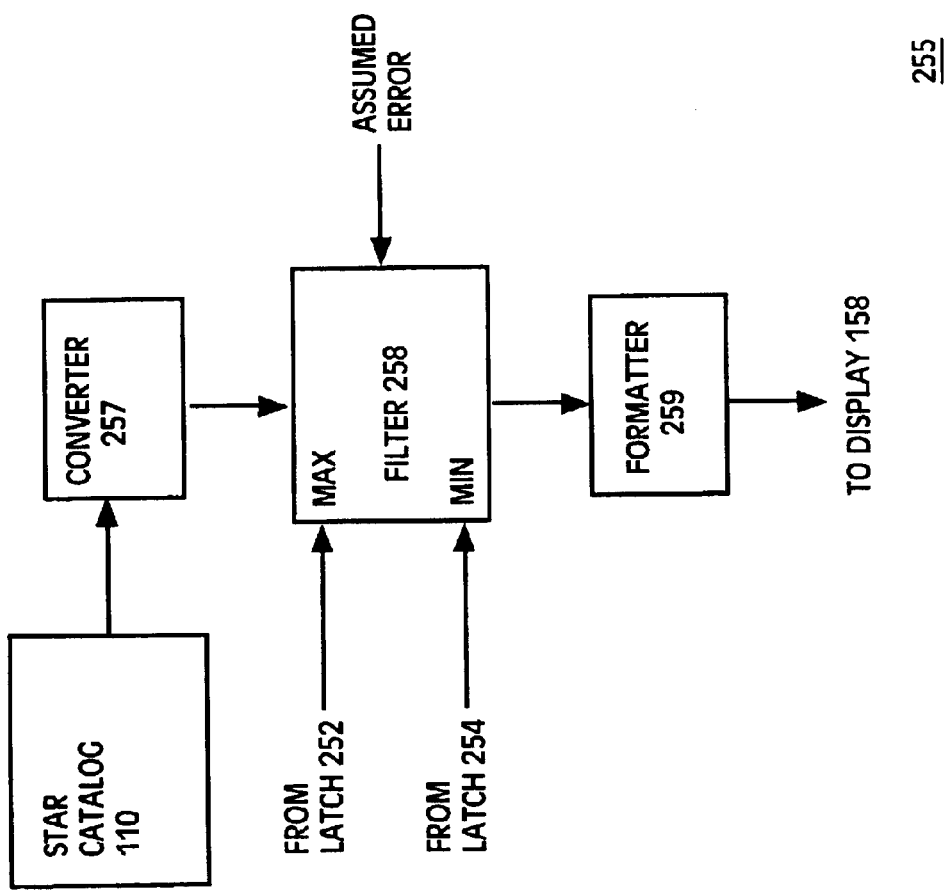
FIG. 7 is a diagram emphasizing another portion of the circuitry shown in FIG. 2.

FIG. 7 is a diagram depicting other circuitry 255 in circuitry 115. Converter 257 takes a star from catalog 110 as input, converts to right ascension and declination, and sends the result to filter 258. Filter 258 takes the maximum right ascension and declination respectively and increases each of those numbers by an assumed error in the spacecraft attitude, to generate upper thresholds for the right ascension and declination. Filter 258 takes the minimum right ascension and declination respectively and decreases each of those numbers by the assumed error, to generate lower thresholds for the right ascension and declination. Filter 258 excludes catalog stars that fall outside these thresholds.

Formatter 259 generates a symbol, to represent a catalog star, and modulates the displayed color of the symbol depending on the cataloged magnitude. The symbol generated by formatter 259 is sent to display 158.

Throughout the Patent Application, certain processing may be depicted in serial, parallel, or other fashion, for ease of description. Actual hardware and software realizations, however, may be varied depending on desired optimizations apparent to one of ordinary skill in the art. For example, circuitry 115 and circuitry 120 may include respective software modules executed be a common computer, or by different computers.

In summary, display processing circuitry 115 color codes the observed and cataloged stars and displays these stars by right ascension and declination. A human operator picks two desired observed star observations and their respective catalog stars. Specifically, in this example, user 150 moves mouse 159 such that display cursor 163 points to circle 327 (representing star 27), and presses left button 162. To pair star 27 with a catalog star, user 150 moves mouse 159 such that cursor 163 points to cross 427, and presses left button 162. Thus, user 150 designates that observed star 27 corresponds to the catalog star represented by cross 427.

Next, in this example, user 150 moves mouse 159 such that display cursor 163 points to circle 332 (representing star 32), and presses left button 162. To pair star 32 with a catalog star, user 150 moves mouse 159 such that cursor 163 points to cross 432, and presses left button 162. Thus, user 150 designates that observed star 32 corresponds to the catalog star represented by cross 432.

Post display processing circuitry 120 includes logic that determines a spacecraft attitude using the star catalog coordinates thus assigned to stars 27 and 32.

Post display processing circuitry 120 will now be described in more detail. Since each picked star will have a different time tag, then the stars converted to vectors from right ascension and declination are propagated to a common epoch time. This propagation is performed in one of two ways:

If the input attitude consists of an attitude history file, then a derived rate array is computed by computing delta quaternions between successive quaternions then deriving the attitude error vector from that delta quaternion then dividing by time to derive a rate. A subset of those derived rates are used to propagate the observed vector between successive times until the desired epoch time is reached If the input attitude consists of a rate history and a single quaternion, then the rates are used to propagate the observed vector between successive times until the desired epoch time is reached.

A spacecraft attitude is then computed using the two observed star vectors and their respective corresponding reference star vectors and displayed, as shown in FIG. 8.

In summary, the exemplary system displays observed stars with reference stars in right ascension and declination and vectors; and generates an output including spacecraft attitude quaternion and time.

ALTERNATIVE EMBODIMENTS OF THE INVENTION

Instead of, or in addition to, sending a determined orientation up to satellite 10, a second embodiment of the invention uses the determined orientation to perform other fprocessing. In this second embodiment, a ground computer may use the determined orientation to review the orientation history of satellite 10 for the prior period in which satellite 10 had a previously indeterminate orientation. Thus, ground processing can determine if sensors on satellite 10 had over exposure to an intense light source, such as the sun, during the prior period.

In accordance with a third embodiment of the invention, the determined orientation is used to initialize an automatic star pattern match algorithm.

In accordance with a fourth embodiment of the invention, instead of the attitude estimate formats described above, a system employs multiple time tagged rate estimate points and one time tagged quaternion, or a single attitude quaternion good for all time points.

In the data structures described above, associated data may be associated by, for example, memory proximity, offset relation, a reference, such as a pointer, between pieces, etc. A reference is not necessarily a direct memory address pointer. Instead, more generally, a reference may be a data entity, stored in association with one (referencing) element, that enables a processor to find a related (referenced) element. To physically address the referenced element, the processor may subject the reference to various translations or mappings.

Various other implementations fall within the scope of Applicants' invention.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method for operating with a spacecraft and a first signal, the first signal including star position data, the method comprising:
   generating a second signal in the spacecraft, the second signal including star observations;
   processing the first and second signals;
   generating a third signal responsive to the processing step;
   displaying the third signal;
   allowing an operator to select and pair the first and second signals displayed as the third signal;
   generating a fourth signal from the paired first and second signals; and
   processing the fourth signal to determine an orientation of the spacecraft.

2. The method of claim 1 wherein the star position data is relative to a first coordinate system, the star observations are in a second coordinate system, and the processing step includes transforming the star observations into a common coordinate system with that of the star position data.

3. The method of claim 2 wherein the common coordinate system is the first coordinate system.

4. The method of claim 1 wherein generating the third signal includes generating an indication of a position of a star.

5. The method of claim 1 wherein generating the third signal includes generating an indication of a position of a star represented in the first signal, and an indication of a position of a star represented in the second signal.

6. The method of claim 1 wherein generating the third signal includes using a first symbol to generate indications of positions of stars represented in the first signal, and using a second symbol to generate indications of positions of stars represented in the second signal.

7. The method of claim 1 wherein generating the third signal includes generating an indication of a characteristic of a star.

8. The method of claim 7 wherein the indication includes a display color and the characteristic includes a magnitude of the star.

9. The method of claim 1 wherein generating the third signal includes generating an indication of coordinates.

10. The method of claim 1 wherein generating the third signal includes generating indications of ascension and declination.

11. The method of claim 1 further including sending the determined orientation to the spacecraft.

12. A system for operating with a first signal including star position data and a spacecraft having a generator that generates a second signal, the second signal including star observations, the system comprising:
   a first processor that processes the first and second signals to generate a third signal for display;
   a second processor that displays the third signal and receives operator input to generate a fourth signal, wherein the operator input includes pairing the first and second signals displayed as the third signal; and
   a third processor that receives the fourth signal, identifying features in the third signal, and processes the fourth signal to determine an orientation of the spacecraft.

13. The system of claim 12 wherein the star position data is relative to a first coordinate system, the star observations are in a second coordinate system, and the first processor acts to transform star observations into a common coordinate system with that of the star position data.

14. The system of claim 13 wherein the common coordinate system is the first coordinate system.

15. The system of claim 12 wherein the third signal includes an indication of a position of a star.

16. The system of claim 12 wherein the third signal includes an indication of a position of a star represented in the first signal, and an indication of a position of a star represented in the second signal.

17. The system of claim 12 wherein the third signal includes a first symbol to generate indications of positions of stars represented in the first signal, and a second symbol to generate indications of positions of stars represented in the second signal.

18. The system of claim 12 wherein the third signal includes an indication of a characteristic of a star.

19. The system of claim 18 wherein the indication includes a display color and the characteristic includes a magnitude of the star.

20. The system of claim 12 wherein the third signal includes an indication of coordinates.

21. The system of claim 12 wherein the fourth signal associates a first star observation with a first position, and associates a second star observation with a second position.

22. A system for operating with a spacecraft and a first signal, the first signal including star position data, the system comprising:

means for generating a second signal in the spacecraft, the second signal including star observations;

means for processing the first and second signals;

means for generating and displaying a third signal responsive to the processing means;

means for receiving operator's input to generate a fourth signal, wherein the operator's input includes pairing the first and second signals displayed as the third signal;

means for receiving the fourth signal identifying features in the third signal; and means for processing the fourth signal to determine an orientation of the spacecraft.

23. The system of claim 22 wherein the star position data is relative to a first coordinate system, the star observations are in a second coordinate system, and the processing means acts to transform the star observations into a common coordinate system with that of the star position data.

24. The system of claim 23 wherein the common coordinate system is the first coordinate system.

25. The system of claim 22 wherein the third signal includes an indication of a position of a star.

26. The system of claim 22 wherein the third signal includes an indication of a position of a star represented in the first signal, and an indication of a position of a star represented in the second signal.

27. The system of claim 22 wherein the third signal includes a first symbol to generate indications of positions of stars represented in the first signal, and a second symbol to generate indications of positions of stars represented in the second signal.

28. The system of claim 22 wherein the third signal includes an indication of a characteristic of a star.

29. The system of claim 28 wherein the indication includes a display color and the characteristic includes a magnitude of the star.

30. The system of claim 22 wherein the third signal includes an indication of coordinates.

31. The system of claim 22 wherein the third signal includes indications of ascension and declination.

* * * * *